(12) United States Patent
Lugo et al.

(10) Patent No.: US 8,899,630 B1
(45) Date of Patent: Dec. 2, 2014

(54) SUBSEA PIPE CONNECTION ASSEMBLY AND METHOD

(75) Inventors: Mario R. Lugo, Spring, TX (US); Randolph G. Smith, Spring, TX (US); Noel F. Mascarenhas, Spring, TX (US)

(73) Assignee: Trendsetter Engineering, Inc., Houston, TX (US)

( * ) Notice: Subject to any disclaimer, the term of this patent is extended or adjusted under 35 U.S.C. 154(b) by 1152 days.

(21) Appl. No.: 12/728,470

(22) Filed: Mar. 22, 2010

(51) Int. Cl.
*F16L 23/032* (2006.01)

(52) U.S. Cl.
USPC ............................. 285/412; 285/368; 285/920

(58) Field of Classification Search
USPC ............ 285/89, 364, 368, 406, 412, 420, 920
See application file for complete search history.

(56) References Cited

U.S. PATENT DOCUMENTS

| | | | | | |
|---|---|---|---|---|---|
| 800,802 | A | * | 10/1905 | Franquist | 285/330 |
| 2,202,492 | A | * | 5/1940 | Jacocks | 285/340 |
| 4,548,273 | A | | 10/1985 | Leicht et al. | |
| 5,273,376 | A | * | 12/1993 | Ritter, Jr. | 405/169 |
| 5,458,439 | A | * | 10/1995 | Hall et al. | 405/158 |
| 6,767,165 | B1 | | 7/2004 | Corbetta | |
| 7,445,404 | B2 | * | 11/2008 | Giles et al. | 405/169 |

\* cited by examiner

*Primary Examiner* — Aaron Dunwoody
*Assistant Examiner* — Fannie Kee
(74) *Attorney, Agent, or Firm* — Egbert Law Offices, PLLC (57) ABSTRACT

A subsea pipe connection assembly has a first flange, a nut magazine positioned against a side of the first flange and having a plurality of nuts therein corresponding to the plurality of holes of the first flange, a second flange having a plurality of holes in alignment with the holes of the first flange, and a plurality of studs extending through holes of the first and second flanges such that the nuts in the nut magazine are affixed to the ends of the studs. A sleeve is affixed to and extending from the second flange. An ROV-delivered frame can be supported on the sleeve of the pipe such that a torquing tool connected to the frame can apply torque to a nut on the stud. The sleeve has a guide surface thereon so as to direct the torquing tool to nuts on the plurality of studs.

11 Claims, 5 Drawing Sheets

SUBSEA PIPE CONNECTION ASSEMBLY AND METHOD

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to subsea pipe connection assemblies. More particularly, the present invention the relates to apparatus and methods for connecting a first flange to a second flange in a subsea location. More particularly, the present invention the relates to remotely-operated vehicle ROV-delivered tools for effectively connecting the flanges together.

2. Description of Related Art Including Information Disclosed Under 37 CFR 1.97 and 37 CFR 1.98.

There are various recognized methods of diverless connection of underwater flow lines and pipelines to underwater structures. The methods used for such connections characterized mainly by two principle factors. These factors include the use of permanently installed underwater hardware known as tie-in porches or reaction structures in the strict dependency upon the related connection system (connector). Both the permanently installed underwater hardware and connection systems have critical parameters. The items of hardware required to support the connection operations are usually installed during flowline or pipeline structure installation. Any deviation from the standard procedures required by the installers can result in a very high cost impact. This can make the system less competitive than other alternative options.

In particular, under certain circumstances, it may be desirable to connect a gas flow pipeline installed in one location to a gas flow pipeline installed at another location. In normal circumstances, in order to allow the ability to tap into another subsea well, various valves are operated and operations are needed so as to change the gas flow lines. Typically, it is necessary to connect the pipeline to a manifold and then to a ship. As such, it would be normal to cut the pipeline, bring the pipeline to the surface and then connect the pipeline to another pipeline. The pipeline is cut off generally adjacent to the valves. This is very complicated, time-consuming and expensive operation. This is especially the case when the flange connections between the pipelines are located at very deep subsea location.

In the past, various patents have issued relating to the ability to connect pipelines in subsea locations. For example, U.S. Pat. No. 6,767,165, issued on Jul. 27, 2004 to G. Corbetta, describes a method and apparatus for connecting underwater conduits. This method includes the steps for launching a remotely-operated vehicle from a support vessel, launching connection operations from the support vessel, manipulating the remotely operated vehicle to dock with the connecting apparatus, installing of the connection apparatus to one of the conduits, activating a docking clamp using the remotely operated vehicle to capture the end of the first conduit, activating the connection apparatus to draw the second conduit to the first, connecting the two conduits together to form a continuous flowline, providing a sealed connection and then recovering the remotely-operated vehicle and connection apparatus to the support vessel.

U.S. Pat. No. 5,273,376, issued on Dec. 28, 1993 to P. B. Ritter, Jr., describes back-up connector release tool. This is an emergency release tool for operation by a remotely-operated vehicle (ROV) for forcefully releasing a riser from a subsea well assembly. The tool includes hydraulic cylinders mounted on a frame that can be positioned by the remotely-operated vehicle to surround the risers. The cylinders are pressurized to forcefully remove the riser from the wellhead assembly.

U.S. Pat. No. 4,548,273, issued on Oct. 22, 1985 to Leicht et al., teaches a torque multiplier subsea tool for setting a seal between a casing hanger and a subsea wellhead. This tool includes a mandrel having a sun gear with axial elongate teeth. An outer barrel is disposed around the mandrel forming an annulus therebetween. A planetary gear assembly is disposed in the annulus between the barrel and the sun gear to transmit to the barrel a torque which is higher in magnitude than that applied to the mandrel. A connector body is disposed around the mandrel, below the planetary gear assembly, and includes radially movable dogs for engaging the casing hanger. The barrel engages the sealing assembly and transmits the increased torque thereto to advance the sealing assembly downwards and to set the seal.

In those circumstances where a pipe flange must be connected to another pipe flange, it has been difficult to effectively install studs and tighten nuts associated with the studs so as to effectively engage one pipe flange with the other pipe flange. Although torquing tools are known for the tightening of nuts associated with studs of flanges, it is very difficult to effectively manipulate an ROV so as to place the torquing tool into a desired location with respect to the nut of the stud.

Additionally, it is often difficult to position the nut in proximity to the desired holes of the pipe flange connection. As such, there is a need to have mechanisms and methods whereby a new pipe connection can be made to an existing pipe connection in a subsea location. In addition, there is a need to provide a tool whereby the nuts on the studs associated with such pipe flange connections can be effectively installed in an effective manner.

It is an object of the present invention to provide an apparatus for connecting pipe flanges which can be effectively utilized in a subsea location.

It is another object of the present invention to provide an apparatus and method for connecting pipe flanges whereby the components of the pipe flange connection can be delivered by an ROV.

It is a further object of the present invention to provide a pipe flange connection assembly whereby the studs associated with the flanges are assuredly properly aligned with associated nuts.

It is still a further object of the present invention to provide an apparatus and method for connecting pipe flanges in a subsea location which allows an ROV to properly align a torquing tool with each of the nuts associated with the studs of the pipe flange connection.

These and other objects and advantages of the present invention will become apparent from a reading of the attached specification and appended claims.

BRIEF SUMMARY OF THE INVENTION

The present invention a subsea pipe connection assembly that comprises a first flange having a plurality of holes formed therein, a nut magazine positioned against the second side of the first flange, a second flange having a plurality of holes formed therein so as to be aligned with the plurality of holes of the first flange, and a plurality of studs respectively extending through the plurality of holes of the first flange and the plurality of holes of the second flange. The nut magazine has a plurality of nuts therein corresponding in location respectively with the plurality of holes of the first flange. The plurality of nuts in the nut magazine are respectively affixed to one end of the plurality of studs. The plurality of studs have a plurality of nuts affixed thereto at the first side of the second flange opposite the first flange.

In the present invention, the nut magazine has a sleeve with an inner surface fitted against an outer periphery of the first flange. The sleeve of the nut magazine has a facing surface overlying a portion of the first side of the first flange. The facing surface extends inwardly from the sleeve. The sleeve has at least one slot formed therein. The slot opens at the first side of first flange. The second side has at least one dog extending therefrom. This dog is received in the slot of the sleeve.

The second flange has a pipe extending therefrom. A sleeve is affixed around the pipe in spaced relation to the second flange. The sleeve has a plurality of guide surfaces formed thereon. The plurality of guide surfaces includes a plurality of slots extending longitudinally along the sleeve. The plurality of slots correspond respectively relative to a position of the plurality of studs.

The present invention is also an apparatus for connecting a first flange to a second flange in an undersea location. This apparatus includes a frame having a surface suitable for placement on the pipe of the second flange. A torquing means is connected to the frame and extends outwardly therefrom. The torquing means serves to apply a torque to the nut on the stud.

In this apparatus, an ROV is operatively connected to the frame. The ROV is suitable for moving the frame to a desired location on the pipe. A sleeve has a plurality of guide surfaces formed thereon. This plurality of guide surfaces respectively corresponds to a location of the plurality of studs. The sleeve is suitable for placement on the pipe. The plurality of guide surfaces each comprises a slot formed on the sleeve. The slot extends longitudinally along the sleeve. The surface of the frame has an arcuate surface with a radius generally matching a radius of an outer diameter of the sleeve. This surface of the frame has at least one key extending therefrom. This key is slidably received by the slot of the sleeve. The sleeve also has a plurality of bars respectively affixed between the plurality of guide surfaces on the sleeve. Each of the plurality of bars each has an end tapered so widen toward the guide surface.

The present invention is also a method of connecting to a first flange in a subsea location. This method comprises the steps of: (1) installing a nut magazine on a side of the first flange such that the nut magazine contains a plurality of nuts positioned in alignment with the holes of the first flange; (2) positioning a second flange against the first flange such that a plurality of holes of the second flange are aligned with the plurality of holes of the first flange; (3) moving a torque tool toward a nut on the stud extending through the holes of the first and second flanges such that the torque tool receives the nut therein; and (4) rotating the torque tool so as to drive the stud into the respective nut in the nut magazine.

In this method, the nut magazine has a sleeve extending therefrom. The step of installing the nut magazine includes placing the nut magazine against the first flange such that an inner surface of the sleeve overlies a portion of a periphery of a first flange. The sleeve has at least one slot formed therein so as to open at a side of the first flange facing the second flange. The second flange has a dog extending outwardly therefrom. The step of positioning the second flange includes moving the second flange toward the first flange such that the dog of the second flange is slidably received by the slot in the sleeve.

In this method, the second flange has a pipe extending therefrom. The method further includes affixing a sleeve over the pipe in spaced relation to the second flange. The sleeve has a plurality of guide surfaces formed thereon.

The torque tool is supported upon a frame. This frame has an arcuate inner surface having a radius generally matching a radius of the outer surface of the sleeve. The inner surface has a key affixed thereto. The step of moving the torque tool includes placing the key into one of the plurality of guide surfaces and sliding the key along the guide surface so as to move the torque tool to a corresponding nut on the stud. The method also includes indexing this key into another of the plurality of guide surfaces and sliding the key along the another of the plurality of guide surfaces so as to move the torque tool toward another nut of another stud.

DETAILED DESCRIPTION OF THE INVENTION

Figure 1:
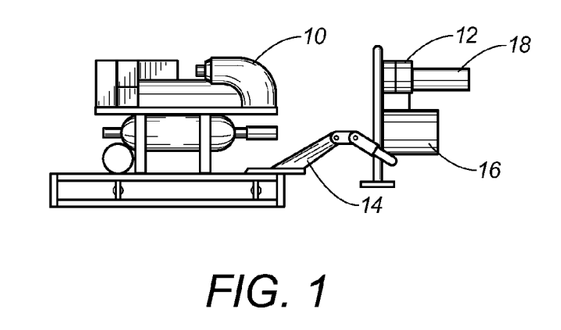
FIG. 1 is an illustration showing an ROV in a position for delivery of the apparatus of the present invention.

Referring to FIG. 1, there is shown an ROV 10 as used for the delivery of a tool 12 for the installation of the subsea pipe connection assembly. The ROV 10 is a remotely-operated vehicle (ROV) that is used in subsea operations. The ROV 10 has an arm 14 that extends outwardly therefrom. Arm 14 is suitable for the manipulation of various items in the subsea installation operation. In FIG. 1, the arm 14 is grasping a handle associated with the tool 12 so as to deliver the tool 12 to the subsea pipe connection assembly.

The tool 12 includes a frame 16 having a torquing tool 18 thereon. The frame 16, as will be described hereinafter, includes an arcuate surface that will be suitable for fitting over a surface of a sleeve affixed to a subsea pipe flange. The torquing tool 18 is in the nature of an impact wrench. The torquing tool 18 will have an interior that is suitable for receiving a nut therein. The torquing tool 18 can be hydraulically operated by connection to hydraulics associated with the ROV 10. Alternatively, the torquing tool 18 can be driven by other means. The term "torquing means" refers to the torquing tool 18. As such, the "torquing means" can be an impact wrench, other types of wrenches, driven sockets, and related devices. As used herein, the term "torquing means" refers to any device that effectively receive a nut and rotate the nut with sufficient torque so as to achieve the necessary connection of flanges.

Figure 2:
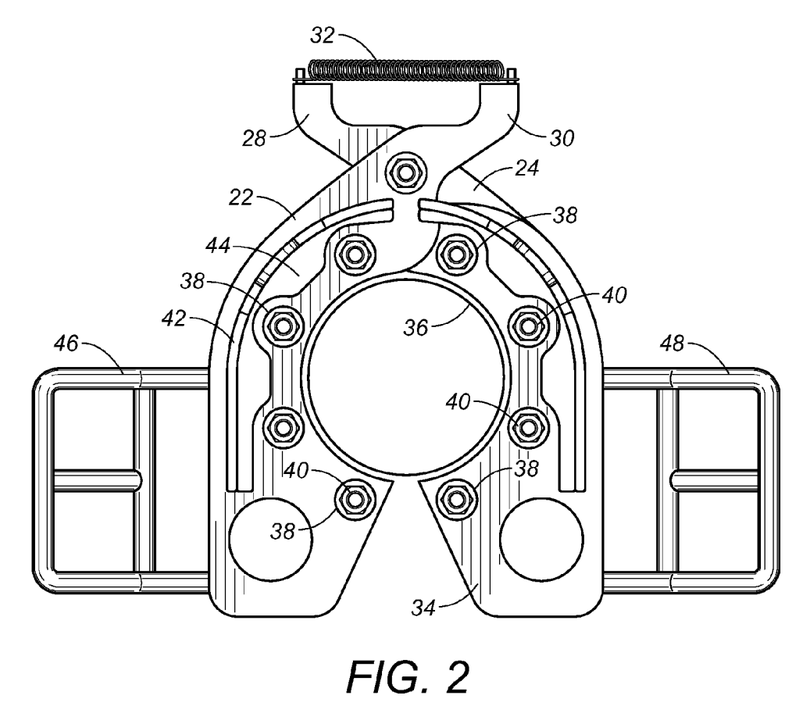
FIG. 2 is an isolated view of the nut magazine as used in the present invention.

FIG. 2 is an isolated view of a nut magazine 20 as used in the apparatus and method of the present invention. The nut magazine 20 is formed of a first plate 22 and a second plate 24 that are pivotally connected together at a pivot point. Arm 28 extends from plate 24. Arm 30 extends from plate 22. A spring mechanism 32 will extend between arms 28 and 30. In normal use, during installation, the plates 22 and 24 are urged by spring 32 to a closed orientation. A funnel-type insertion surface 34 is formed at the bottom of plates 22 and 24 such that as the nut magazine 20 is placed over a pipe, the plates 22 and 24 will separate from each other when being pushed downwardly. The spring 32 will then urge the plates 22 and 24 together so as to envelop around the pipe received within the interior opening 36.

A plurality of sockets 38 are formed on the surface of the plates 22 and 24. Sockets 38 will correspond in location to the holes formed in the respective flange against which the nut magazine 20 is placed. A nut 40 is positioned within each of the sockets 38. Nut 40 will be positioned so as to be in alignment with the hole of the associated flange. In the preferred embodiment of the present invention, the nuts 40 are in the nature of "zip nuts". These zip nuts are configured so as to avoid problems associated with precise threading. The threads of a stud can be inserted into the interior of the respective nuts and self-thread into the interior. As such, the use of such "zip nuts" avoids the need for precise alignment of the respective nuts 38 with the associated stud.

A sleeve 42 extends outwardly of the plates 22 and 24. As will be described hereinafter, the sleeve 42 is configured for placement over the outer periphery of a flange. A facing surface 44 extends inwardly from the sleeve 42. The facing surface 44 will overlie a face of a flange upon which the sleeve 42 is placed. As such, the sleeve 42, and the associated facing surface 44, will assure precise alignment of the sockets 38 (along with their associated nuts 40) with respective holes in a flange.

Handles 46 and 48 extend outwardly, respectively, from plates 22 and 24. Handles 46 and 48 can be suitably manipulated by the ROV so as to assure that the nut magazine 20 is positioned in a desired location.

Figure 3:
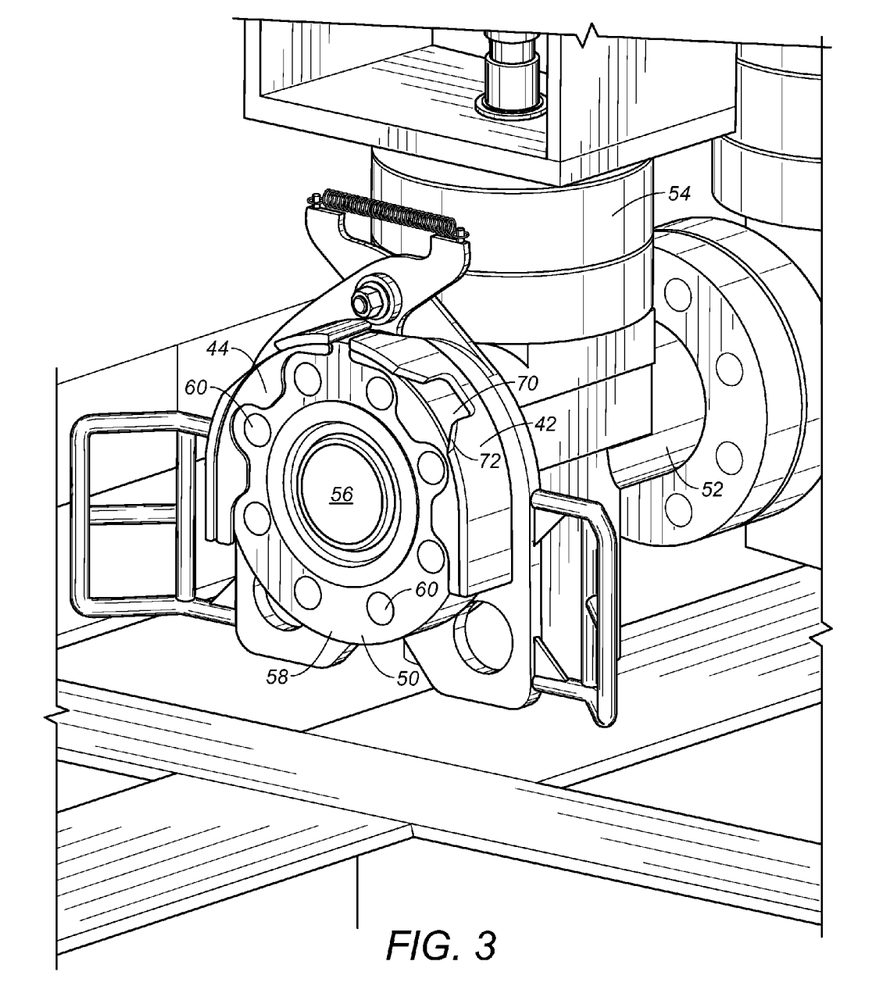
FIG. 3 is a perspective view showing the application of the nut magazine onto a first flange of a subsea pipe connection assembly.

FIG. 3 shows the initial step of the method of the present invention. As can be seen in FIG. 3, there is first flange 50 that is connected to a pipe 52. A valve 54 is positioned along the pipe 52. The pipe 52 has an interior 56 extending therethrough.

In FIG. 3, it can be seen that the first flange 50 has a first side against which the nut magazine 20 is placed. The flange 50 also has a second side 58 to which another flange is to be connected. A plurality of holes 60 are formed through the flange 50. Holes 60 are arranged so as to be suitable for allowing studs to be positioned therein and therethrough.

It can be seen that the nut magazine 20 is positioned against the first side of the flange 50. The sleeve 42 has an inner surface that will reside in surface-to-surface relation with the outer periphery of the flange 50. The facing surfaces 44 will overlie a portion of the second side 58 of the flange 50. It can be seen that, by this arrangement of the sleeve 42 and the facing surfaces 44, the nut magazine 20 can be properly aligned with the holes 60 of the flange 50.

Figure 4:
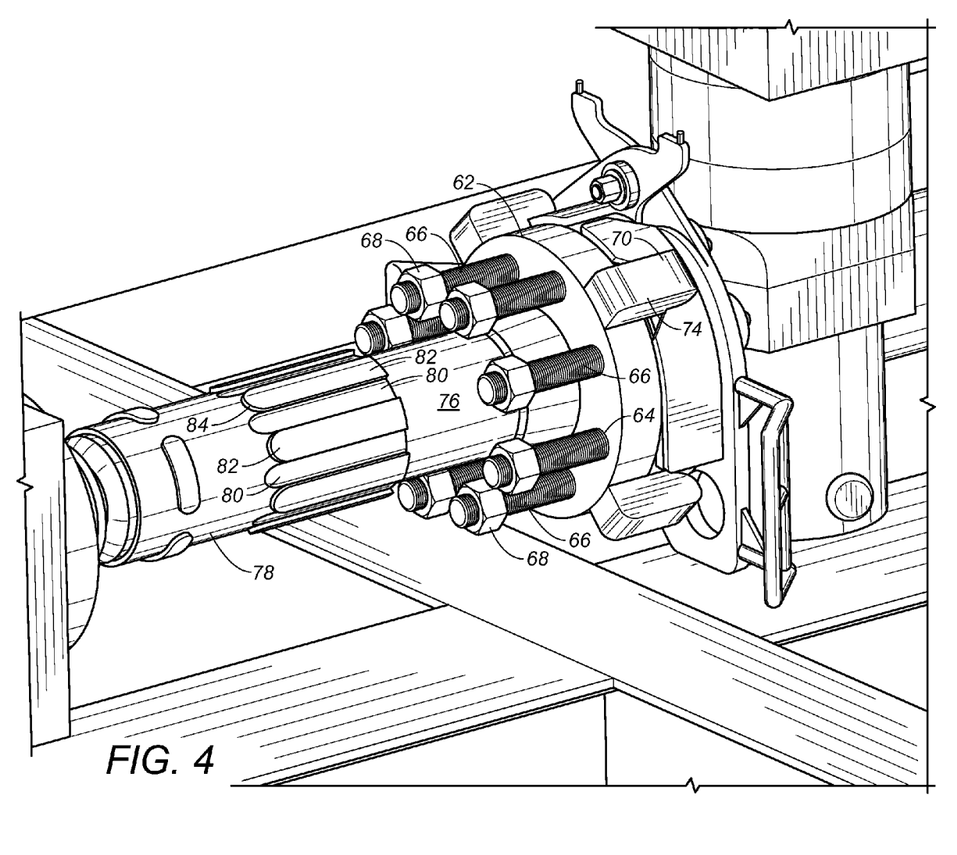
FIG. 4 is a perspective view showing a subsequent step in which a second flange is positioned against the first flange in the subsea pipe connection assembly.

FIG. 4 shows that a second flange 62 has been delivered in a location adjacent to the second side 58 of the first flange 50. The second flange 62 has a first side that resides against the second side 58 of the flange 50. A plurality of holes 64 are formed through the second flange 62 so as to allow studs 66 to be inserted therethrough. Each of the studs 66 has a nut 68 affixed thereto. In normal use, the nut 68 can be affixed to the threaded end of the stud 66 prior to delivery by the ROV. Additionally, the stud 66 can be retained within the holes 64 by various means, such as adhesives. It can be seen that the stud 66 extends outwardly of the second side of the second flange 62 for a distance. As such, the nuts 68, along with their associated studs 66, are in a proper position for being driven into the nuts 40 associated with the sockets 38 of the nut magazine 20.

With the reference to FIG. 3, it can be seen that the sleeve 42 has at least one slot 70 formed therein. Slot 70 opens to the second side 58 of the flange 50. The slot 70 includes inclined edges 72 that serve to funnel toward the inside of slot 70. In FIG. 4, it can be seen that the second flange 62 has dogs 74 affixed to a periphery thereof and which extend toward the first flange 50. The dogs 74 have a shape so as to be tightly received within the slot 70. The funneling action of the inclined surfaces 72 will serve to cause the dogs 74 to properly enter the slot 70. As such, this arrangement assures precise alignment of the second flange 62 with the first flange 50. This precise alignment is necessary so as to assure that the hole 64 of the second flange 62 aligns with the hole 60 of the first flange 50.

In FIG. 4, it can be seen that there is pipe 76 that is affixed to the flange 62 and extends outwardly therefrom. The pipe 76 has a sleeve 78 affixed therearound. Sleeve 78 includes guide surfaces 80 extending longitudinally therealong. Guide surfaces 80 are in the nature of slots that are formed into the sleeve 78. Bars 82 are positioned between the guide surface 80. Each of the bars 82 has a tapered end 84 that widens from the end of the bar 82 toward the guide surface 80. As such, this tapered end 84 serves to cause and urge the frame 16 of tool 12 into a desired position relative to the various studs 66 and their associated nuts 68. The sleeve 78 can be affixed to the pipe 76 by various techniques. The sleeve 78 should extend around the outer diameter of the pipe 76. The bars 82 project upwardly from the outer surface of the sleeve 78 for a small distance.

Figure 5:
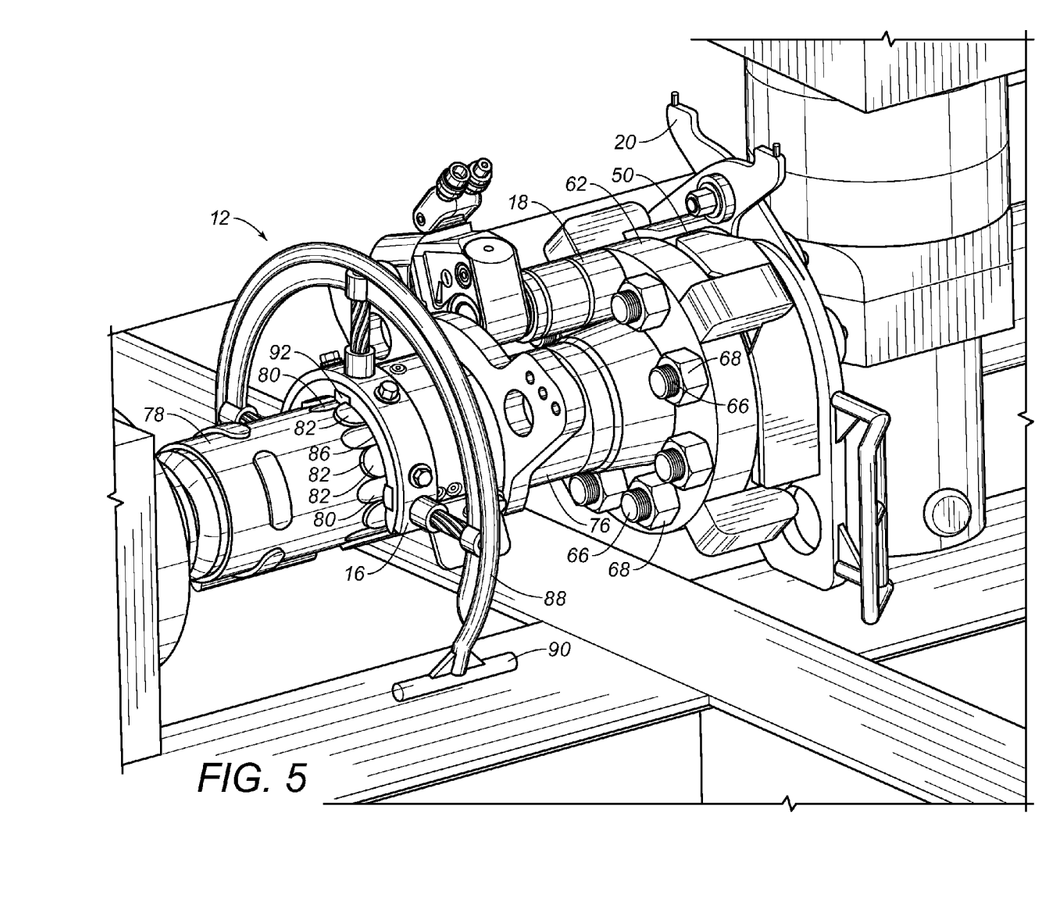
FIG. 5 illustrate the use of the apparatus of the present invention for the purposes of tightening the nut on the studs.

FIG. 5 shows tool 12 of the present invention in a position as delivered by the ROV 10 for the purposes of driving the stud 66 into a desired position so as to properly affix the second flange 62 to the first flange 50.

Initially, it can be seen that the tool 12 includes a frame 16 having an arcuate inner surface 86 positioned against the outer surface of the sleeve 78 on pipe 76. The inner surface 86 of frame 16 has a radius that approximately matches the radius of the outer surface of the sleeve 78. The frame 16 further includes a semi-circular arm assembly 88 extending outwardly from the arcuate inner surface 86. Arm 88 includes a handle 90 at one end thereof. Handle 90 is suitable for manipulation by the ROV.

The torquing tool 18 is illustrated as extending outwardly of the frame 16 and in a position so as to receive one of the nuts 68 therein. The torquing tool 18 is actuated so as to apply torque to the nut 68 and for the purpose of driving the stud 66 inwardly and through the holes 64 of the flange 62. As such, as the torquing tool 18 rotates the nut 68, the stud 66 is driven into the nut 40 in the socket 38 of the nut magazine 20. This process is repeated until all of their associated studs 66 are effectively driven with a desired amount of torque. As a result, the second flange 62 will be strongly juxtaposed against the first flange 50.

Importantly, in the present invention, the guide surfaces 80 on the sleeve 78 assure precise alignment of the torquing tool 18 with the nuts 68 and their associated studs 66. A key 92 extends inwardly from the inner surface 86 of the frame 16. It can be seen that the key 92 is received within one of the slots 80. Bars 82 serve to assure that the key 92 is retained within guide surfaces 80. The tapered end 84 serves a guide so as to allow the ROV to properly direct the key 92 into the respective slot.

As the nut 68 and the associated stud 66 are driven through the holes in the second flange 62 and into the nuts 40 in the nut magazine 20, the ROV can simply push the frame 16 along the guide surfaces 80. Since the guide surfaces 80 are aligned with respective studs 66, proper alignment between the torquing tool 18 and the respective nuts 68 is assured.

After one of the nuts 68 is properly tightened by the torquing tool 18, the ROV can slide frame 16 outwardly and then rotate the semi-circular arm 88 a small distance such that the key 92 will engage another guide surface. As such, the torquing tool 18 can then be aligned with another nut 68. This indexing step can be carried out until all of the nuts 68 are effectively tightened.

It should be noted that the inner surface 86 of the frame 16 has a generally semi-tubular shape. As such, it is only necessary for the ROV to simply place the frame 16 upon the sleeve 78. The forces imparted by the torquing tool 18 are effectively absorbed by the strong structural strength of the pipe 76 and its associated sleeve 78. As such, the force of the torquing action is not imparted to the ROV. The ROV 10 is only necessary to manipulate the angular orientation of the frame 16 with respect to sleeve 78 in order to achieve the effective tightening of the nut 68 and the securement of the second flange 62 to the first flange 50.

Figure 6:
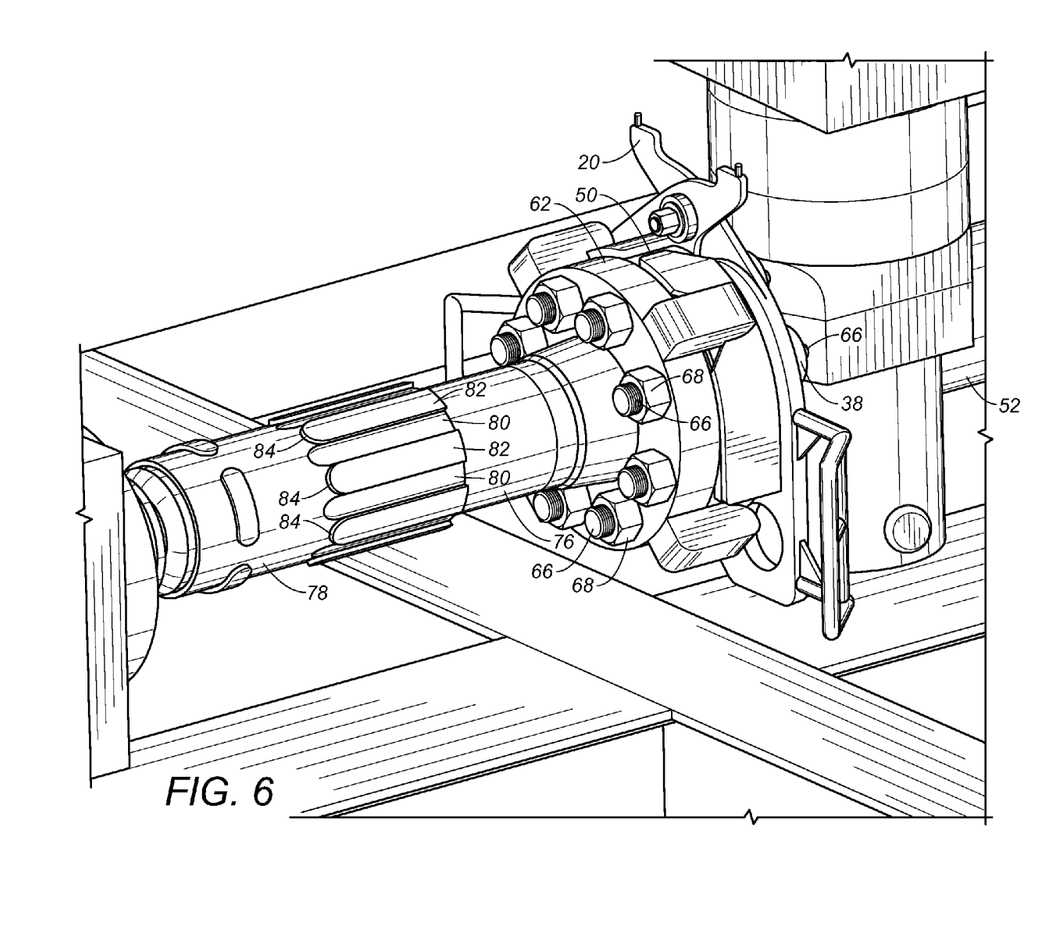
FIG. 6 is perspective view showing the completed subsea pipe flange connection assembly.

FIG. 6 shows the completed subsea pipe connection assembly. As can be seen, the second flange 62 is effectively secured to the first flange 50. The nut magazine 20 will continue to remain in place. It can be seen in FIG. 6 that the opposite end of the stud 66 will protrude outwardly of the socket 38 on the nut magazine. The nut 40 in the socket 38 will securely remain in place.

In FIG. 6, it can be seen that all of the nuts 68 and their associated stud 66 have been driven into position by the torquing tool 18. The frame 16 of the tool 12 has been removed from the sleeve 78 of pipe 76. As such, the pipe 76 and its connected flange 62 are now properly connected to the flange 50 of the pipe 52.

In FIG. 6, the nature of the guide surfaces 80 and the bars 82 are properly illustrated. The bars 82 are directly positioned between adjacent guide surfaces 80. The guide surfaces 80 are in the nature of slots formed in the sleeve 78. The tapered end 84 of each of the bars 82 helps to guide the key 92 into the slots of the guide surfaces 80. As such, the present invention facilitates proper indexing of the tool 12 for the purposes of driving the nut 68 and the studs 66 into the position illustrated in FIG. 6.

The foregoing disclosure and description of the invention is illustrative and explanatory thereof. Various changes in the details of the illustrated construction and in the steps of the described method can be made within the scope of the appended claims without departing from the true spirit of the invention. The present invention should only be limited by the following claims and their legal equivalents.

We claim:

1. A subsea pipe connection assembly comprising:
a first flange having a plurality of holes formed therein, said first flange having a first side and a second side;
a nut magazine positioned against said second side of said first flange, said nut magazine having a plurality of nuts therein corresponding in location respectively with said plurality of holes of said first flange;
a second flange having a plurality of holes formed therein, said plurality of holes of said second flange aligned with said plurality of holes of said first flange, said second flange having a first side and a second side; and
a plurality of studs respectively extending through said plurality of holes of said first flange and said plurality of holes of said second flange, said plurality of nuts in said nut magazine respectively affixed to one end of said plurality of studs, said plurality of studs respectively having a plurality of nuts affixed thereto at said first side of said second flange, said nut magazine having a sleeve having an inner surface fitted against an outer periphery of said first flange, said sleeve of said nut magazine having a facing surface overlying a portion of said first side of said first flange, said facing surface extending inwardly from said sleeve.

2. A subsea pipe connection assembly comprising:
a first flange having a plurality of holes formed therein, said first flange having a first side and a second side;
a nut magazine positioned against said second side of said first flange, said nut magazine having a plurality of nuts therein corresponding in location respectively with said plurality of holes of said first flange;
a second flange having a plurality of holes formed therein, said plurality of holes of said second flange aligned with said plurality of holes of said first flange, said second flange having a first side and a second side; and
a plurality of studs respectively extending through said plurality of holes of said first flange and said plurality of holes of said second flange, said plurality of nuts in said nut magazine respectively affixed to one end of said plurality of studs, said plurality of studs respectively having a plurality of nuts affixed thereto at said first side of said second flange, said nut magazine having a sleeve having an inner surface fitted against an outer periphery of said first flange, said sleeve having at least one slot formed therein, said at least one slot opening at said first side of first flange.

3. The subsea pipe connection assembly of claim 2, said second side of said second flange having at least one dog extending therefrom, said at least one dog received in the slot of said sleeve.

4. A subsea pipe connection assembly comprising:
a first flange having a plurality of holes formed therein, said first flange having a first side and a second side;
a nut magazine positioned against said second side of said first flange, said nut magazine having a plurality of nuts therein corresponding in location respectively with said plurality of holes of said first flange;
a second flange having a plurality of holes formed therein, said plurality of holes of said second flange aligned with said plurality of holes of said first flange, said second flange having a first side and a second side; and
a plurality of studs respectively extending through said plurality of holes of said first flange and said plurality of holes of said second flange, said plurality of nuts in said nut magazine respectively affixed to one end of said plurality of studs, said plurality of studs respectively having a plurality of nuts affixed thereto at said first side of said second flange, said second flange having a pipe extending therefrom; and a sleeve affixed around said pipe in spaced relation to said second flange, said sleeve having a plurality of guide surfaces formed thereon.

5. The subsea pipe connection assembly of claim 4, said plurality of guide surfaces comprising:

a plurality of slots extending longitudinally along said sleeve, said plurality of slots corresponding respectively relative to a position of said plurality of studs.

6. A subsea connection apparatus, comprising:

a first flange and a second flange having a plurality of studs extending through holes formed therein, each of the plurality of studs having a nut thereon adjacent a side of the second flange, the second flange having a pipe extending therefrom;

a frame having a surface suitable for placement on the pipe, a torquing means connected to said frame and extending outwardly therefrom, said torquing means for applying a torque to the nut on the stud; and a sleeve having a plurality of guide surfaces formed therein, said plurality of guide surfaces respectively corresponding to a location of the plurality of studs, said sleeve suitable for placement on the pipe.

7. The apparatus of claim 6, further comprising:

a remotely-operated vehicle operatively connected to said frame, said remotely-operated vehicle suitable for moving said frame to a desired location on the pipe.

8. The apparatus of claim 6, said plurality of guide surfaces each comprising a slot formed on said sleeve, said slots extending longitudinally along said sleeve.

9. The apparatus of claim 8, said surface of said frame being an arcuate surface having a radius generally matching a radius of an outer diameter of said sleeve.

10. The apparatus of claim 9, said surface of said frame having at least one key extending therefrom, the at least one key being slidably received by one of said slots of said sleeve.

11. The apparatus of claim 6, said sleeve having a plurality of bars respectively affixed between said plurality of guide surfaces on said sleeve.

\* \* \* \* \*